United States Patent
Dürdoth et al.

(10) Patent No.: US 12,504,074 B2
(45) Date of Patent: Dec. 23, 2025

(54) PISTON RING HAVING A WEAR PROTECTION LAYER CONTAINING PARTICLES, METHOD FOR PRODUCTION AND USE

(71) Applicant: Federal-Mogul Burscheid GmbH, Burscheid (DE)

(72) Inventors: Stefan Dürdoth, Burscheid (DE); Anika Distelrath-Lübeck, Leverkusen (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 87 days.

(21) Appl. No.: 18/694,045

(22) PCT Filed: Sep. 28, 2022

(86) PCT No.: PCT/EP2022/077023
§ 371 (c)(1),
(2) Date: Mar. 21, 2024

(87) PCT Pub. No.: WO2023/052452
PCT Pub. Date: Apr. 6, 2023

(65) Prior Publication Data
US 2024/0384791 A1 Nov. 21, 2024

(30) Foreign Application Priority Data
Sep. 30, 2021 (DE) .................. 10 2021 125 366.7

(51) Int. Cl.
*F16J 9/26* (2006.01)
*C25D 3/20* (2006.01)
(Continued)

(52) U.S. Cl.
CPC .................. *F16J 9/26* (2013.01); *C25D 3/20* (2013.01); *C25D 5/50* (2013.01); *C25D 5/625* (2020.08);
(Continued)

(58) Field of Classification Search
CPC ..... F16J 9/26; C25D 3/20; C25D 5/18; C25D 5/50; C25D 5/625; C25D 7/04; C25D 15/00
See application file for complete search history.

(56) References Cited

U.S. PATENT DOCUMENTS

| 8,337,687 B2* | 12/2012 | Linde ............ C25D 3/04 148/423 |
| 2003/0116442 A1* | 6/2003 | Meyer ............ C25D 3/562 205/270 |

(Continued)

FOREIGN PATENT DOCUMENTS

| DE | 3531410 A1 | 3/1987 |
| DE | 19508419 C1 | 11/1996 |
| EP | 0217126 A1 | 4/1987 |

*Primary Examiner* — Nicholas L Foster
(74) *Attorney, Agent, or Firm* — Dickinson Wright PLLC

(57) ABSTRACT

A piston ring for internal combustion engines is provided, having a surface comprising a wear protection layer of iron or an iron alloy applied to the surface, wherein the wear protection layer has cracks and the cracks have an average density of 10-160 cracks per mm of the wear protection layer, wherein the iron or iron alloy have incorporated therein 0.2-15% by weight, based on the total weight of the wear protection layer, of carbon particles and 0.2-15% by weight, based on the total weight of the wear protection layer, of solid particles other than carbon particles. Furthermore, a method for manufacturing a piston ring is provided.

13 Claims, 1 Drawing Sheet

(51) Int. Cl.
 *C25D 5/00* (2006.01)
 *C25D 5/18* (2006.01)
 *C25D 5/50* (2006.01)
 *C25D 7/04* (2006.01)
 *C25D 15/00* (2006.01)

(52) U.S. Cl.
 CPC .............. *C25D 7/04* (2013.01); *C25D 15/00* (2013.01); *C25D 5/18* (2013.01)

(56) References Cited

U.S. PATENT DOCUMENTS

| | | | |
|---|---|---|---|
| 2005/0189232 A1 | 9/2005 | Fels et al. | |
| 2011/0115167 A1* | 5/2011 | Linde | C25D 5/625 |
| | | | 205/103 |
| 2018/0010689 A1* | 1/2018 | Toth | F16J 9/26 |
| 2023/0147997 A1* | 5/2023 | Schmidt | C25D 5/625 |
| | | | 205/103 |

* cited by examiner

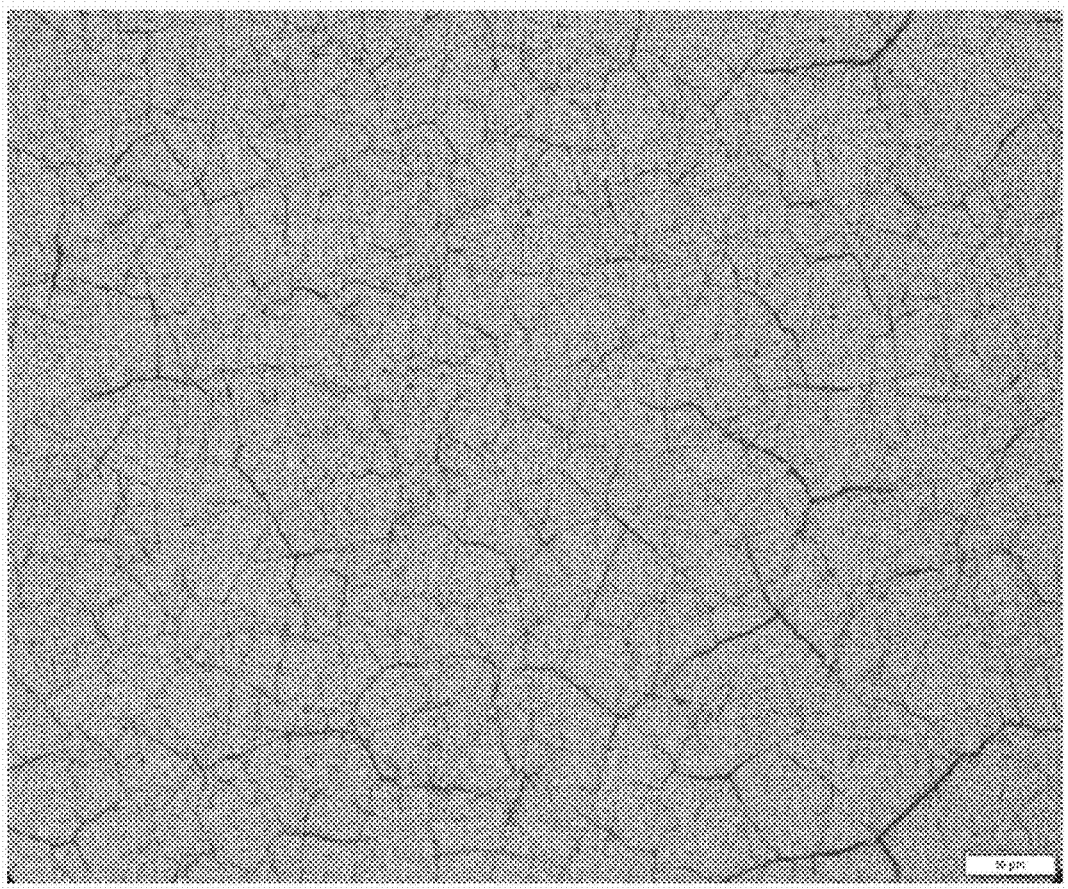

PISTON RING HAVING A WEAR PROTECTION LAYER CONTAINING PARTICLES, METHOD FOR PRODUCTION AND USE

BACKGROUND

1. Technical Field

The invention relates to a piston ring made of iron or an iron alloy, wherein solid particles are embedded in the iron or the iron alloy. The invention also relates to a method for manufacturing the piston ring and the use of the piston ring in an internal combustion engine.

2. Related Art

Piston rings for internal combustion engines are exposed to high friction and high temperatures and must therefore have surfaces that are highly resistant to wear and have good sliding properties. For this purpose, wear protection layers are usually applied to the outer circumferential surfaces (running surfaces) of the piston rings, for example electrolytically deposited hard chrome layers. In addition to high wear resistance, the wear protection layers should also have the highest possible dimensional stability, i.e. if the piston rings change shape during engine operation, the wear protection layers should be as durable as possible and not break.

Solid particles can be incorporated into hard chrome layers to improve wear resistance. DE 3531410 A1 and EP 0217126 A1 describe electroplated hard chrome layers in which solid particles are embedded in the cracks.

However, one of the disadvantages of known hard chrome solid particle layers is that electrolytes containing chromium (VI) are required to produce the hard chrome layers and chromium (VI) is highly toxic. Processes for the production of hard chrome layers using chromium (VI) will probably no longer be permitted within a few years. To protect the environment and to protect humans and animals, piston rings with chromium-free wear protection layers are therefore desirable.

Wear protection layers for iron piston rings in which solid particles are embedded are known from DE 195 08 419 C1. However, the hardness and wear resistance of these wear protection layers are no longer sufficient for the high thermal and mechanical requirements of piston rings in modern internal combustion engines.

SUMMARY

It is an object to overcome the above-mentioned disadvantages of the prior art and to provide a piston ring with a wear protection layer whose wear protection layer that is chromium-free and which has a high wear resistance, hardness and dimensional stability. Furthermore, it is an object to provide a method for producing such a wear protection layer.

A piston ring for internal combustion engines has a surface comprising a wear protection layer of iron or an iron alloy applied to the surface, wherein the wear protection layer has cracks and the cracks have an average density of 10-160 cracks per mm of the wear protection layer Carbon particles are embedded into the iron or the iron alloy in a proportion of 0.2-15% by weight, based on the total weight of the wear protection layer, and 0.2-15% by weight, based on the total weight of the wear protection layer, of solid particles which are not carbon particles.

A method for manufacturing a piston ring, comprises the steps of:
(a) a piston ring is placed in an aqueous electrolyte containing an iron(II) compound in an amount corresponding to 100-500 g/l $FeCl_2$, optionally a salt of a further metal, carbon particles and solid particles which are not carbon particles, wherein the pH of the aqueous electrolyte is ≤0, then
(b) a wear protection layer of iron or an iron alloy is galvanically deposited on the piston ring at a cathodic current density of 10-80 $A/dm^2$, then
(c) the piston ring with wear protection layer is dried and
(d) is heated to 300-700° C.

A piston ring, obtainable by the above method and a use of the piston ring in an internal combustion engine.

It was surprisingly found that the wear protection layer of the piston ring has a high hardness, a high dimensional stability and at the same time a high wear resistance.

The crack density of 10-160 cracks per mm of the wear protection layer ensures in particular a high dimensional stability of the wear protection layer and is achieved, among other things, by the low pH value of the electrolyte. The heat treatment primarily increases the hardness of the wear protection layer. It is assumed, without being bound according to the invention by this explanation, that the carbon particles are partially converted into Fe—C compounds (iron-carbon compounds), which are partly responsible for the above-mentioned advantageous properties of the wear protection layer, in particular the increased hardness. The solid particles which are not carbon particles, on the other hand, remain in the wear protection layer, and it is assumed, without being bound according to the invention by this explanation, that these solid particles which are not carbon particles are primarily responsible for the high wear resistance of the layer. In this way, a combination of greater hardness and good wear resistance of the wear protection layer according to the invention is achieved.

Preferred is a piston ring, having a surface, comprising a wear protection layer of iron or an iron alloy applied to the surface, wherein the wear protection layer has cracks and the cracks have an average density of 10-160 cracks per mm of the wear protection layer, wherein 0.2-15% by weight, based on the total weight of the wear protection layer, of carbon particles and 0.2-15% by weight, based on the total weight of the wear protection layer, of solid particles which are not carbon particles are incorporated into the iron or the iron alloy, and wherein the carbon particles are partially or completely converted into Fe—C compounds. This means that the wear protection layer contains Fe—C compounds. The conversion preferably takes place by heating the wear protection layer to 300-700° C.

In a preferred embodiment, the wear protection layer comprises 0.01-25% by weight iron-carbon compounds, based on the total weight of the wear protection layer, more preferably 0.05-10% by weight iron-carbon compounds, in particular 0.1-5% by weight iron-carbon compounds. The iron-carbon compounds are formed from the carbon particles and the surrounding iron when heated to 300-700° C.

The heat treatment temperatures of 300-700° C. are particularly higher than the temperatures to which piston rings are exposed when used in internal combustion engines, as the temperatures at the wear protection layer are regularly below 250° C. there. The heat treatment of the piston ring or the wear protection layer prior to its use in engines is therefore necessary in order to at least partially convert the carbon particles and thus produce the improved properties of the piston rings.

The temperature in the heat treatment of the piston ring or the wear protection layer is 300-700° C., preferably 320-650° C., more preferably 340-600° C., even more preferably 350-550° C., in particular 380-540° C. With these temperatures, a particularly advantageous combination of increased hardness and high wear resistance of the wear protection layer can be achieved. The heat treatment is preferably carried out for more than 15 minutes, preferably more than 30 minutes, more preferably 1 to 4 hours.

The carbon particles are preferably made of diamond and/or graphite, and diamond particles are even more preferred.

In order to achieve a high wear resistance, hard material particles are preferably used as solid particles which are not carbon particles. For the purposes of the invention, hard material particles are understood to be particles of materials which have a Mohs hardness of 8 or higher. Among these, hard material particles with a Mohs hardness of 9 or higher are preferred, in particular those with a Mohs hardness of 9.2-10. The Mohs hardness is determined according to the Mohs hardness test known in the prior art. Preferred hard material particles are those made of tungsten carbide, chromium carbide, aluminum oxide, silicon carbide, silicon nitride, boron carbide and/or cubic boron nitride. Most preferred is cubic boron nitride (body-centered cubic boron nitride).

Additional solid lubricant particles can advantageously improve the sliding properties of the wear protection layer even further. Examples of solid lubricating particles are hexagonal boron nitride or polymer particles.

The proportion of carbon particles and the proportion of solid particles that are not carbon particles is, independently of one another, 0.2-15% by weight, preferably 0.5-12% by weight, more preferably 1-10% by weight and most preferably 2-8% by weight, based on the total weight of the wear protection layer.

The average particle size (grain size) of the carbon particles and the solid particles that are not carbon particles is 0.02-5 μm, preferably 0.05-3 μm, particularly preferably 0.1-1 μm, especially 0.2-0.8 μm. The average particle size ($d_{50}$) is determined by laser diffraction in the dry disperser (device: Malvern Mastersizer with Scirocco dispersion unit). The average particle size ($d_{50}$) is the value at which 50% by volume have a smaller particle size and 50% by volume have a larger particle size than the specified value.

It is further preferred that not only the average particle size, but all particles are in the specified size range. The particle size of the carbon particles and of the solid particles which are not carbon particles is therefore preferably 0.02-5 μm, more preferably 0.05-3 μm, even more preferably 0.1-1 μm, in particular 0.2-0.8 μm, independently of one another.

The wear protection layer is made of iron or an iron alloy. The iron alloy preferably comprises ≥85% by weight iron, based on the total weight of the iron alloy, more preferably ≥95% by weight iron, in particular 98-99.8% by weight iron. The alloying component of the iron alloy can be one of the typical alloying elements of iron, preferably Cr, Ni, Mo, Mn, V, W, Al and/or Nb.

The hardness of the wear protection layer according to the invention in Vickers is preferably 500-750 HV 0.1, more preferably 550-700 HV 0.1, most preferably 600-700 HV 0.1. The Vickers hardness is determined according to the method known in the prior art for determining the Vickers hardness.

A piston ring with cracks in the wear protection layer exhibits improved dimensional stability compared to crack-free wear protection layers. Without being bound according to the invention by this explanation, it is assumed that the increased dimensional stability is due to the reduction or better distribution of stress within the layer by the cracks, as a result of which the layer does not break so easily, i.e. breakouts of material are avoided. The avoidance of material breakouts as a result of the improved dimensional stability also leads to a considerable reduction in wear, as material breakouts always mean heavy wear.

When piston rings wear on the surface directed to the cylinder (running surface of the piston ring), a distinction is made between adhesive wear and abrasive wear. Adhesive wear is a transfer of material from the cylinder running surface (liner) to the piston ring, and vice versa, wherein the material transfer essentially takes place from the liner to the ring. Abrasive wear, on the other hand, involves abrasion of the running partners. Adhesive wear in the wear protection layer according to the invention is improved, among other things, by the distribution of the solid particles in the matrix and, on the other hand, by the reduced breakouts as a result of the increased dimensional stability, and abrasive wear is improved, among other things, by the formation of a lubricating film. In the preferably formed open cracks on the surface that are not filled with material, engine oil collects on the one hand and residues from the oil in the form of solid combustion residues on the other, which also act as a lubricant. Both improve the sliding properties of the surface of the wear protection layer and also have significant advantages in the event of too low lubrication, as can occur in engines.

The process, which uses a low pH value of ≤0, leads to a particularly high wear resistance and dimensional stability of the wear protection layer, as the cracks and particles are very evenly distributed in the layer.

The particles are thus preferably distributed over the entire wear protection layer, i.e. they are not limited to the cracks, unlike hard chrome layers, for example, in which the particles are located exclusively in the cracks. This even distribution means that there are no large areas where there are no or only a few particles, which improves the wear resistance of the layer evenly. In addition, the particles are particularly firmly bound in the metal, which means that they do not break out of the surface as easily during operation as is the case with hard chrome layers, for example, where the particles are only found in cracks. Overall, this results in high wear resistance.

To form the wear protection layer on a piston ring, a piston ring to be coated is placed in an electrolyte which contains iron ions, optionally metal ions of a metal other than iron, carbon particles and solid particles which are not carbon particles, and is cathodically connected. A direct current or a pulsating direct current, for example a pulsating direct current with a frequency of 10 kHz, is applied to the piston ring and an iron layer or iron alloy layer is thus galvanically deposited.

"Electrolyte" or "aqueous electrolyte" means an aqueous solution whose electrical conductivity is produced by electrolytic dissociation of components of the electrolyte into ions. In addition to the components mentioned and any other additives present, the electrolyte contains water as remainder.

In the method, the solid particles are preferably kept suspended in the electrolyte. This can be achieved, for example, by intensive stirring and/or by using surface-active substances. Preferably, the electrolyte contains one or more surface-active compounds. These can be ionic, non-ionic and amphoteric surface-active (boundary layer-active) compounds. Preferred surface-active compounds are polyfluorinated sulfonates. Preferably, the surface-active compounds are PFOS-free.

In the deposition step (step b of the process), cracks form in the wear protection layer made of iron or an iron alloy. These cracks are generally at least partially interconnected, so that one can speak of a crack network. In a preferred embodiment, the solid particles are surprisingly practically not deposited in the cracks in the process according to the invention, even if they fit into the cracks in terms of size. This is attributed to, among other things, the low pH value of the electrolyte of ≤0.

As described above, in a preferred embodiment, the carbon particles and/or the solid particles that are not carbon particles are predominantly not located in the cracks. Rather, the carbon particles and/or the solid particles that are not carbon particles are substantially embedded in the matrix of the wear protection layer. For the purposes of the invention, the term matrix refers to the entirety of the metallic wear protection layer with the exception of the cracks, i.e. the entire material of the wear protection layer that is not present in the form of cracks and is not solid particles. This improves the wear behavior because the solid particles make a significant contribution to the wear resistance and so there are no large areas in which there are no or only very few particles. Furthermore, the particles are particularly firmly bound in the matrix, which means that they do not break out of the surface so easily during operation.

In a preferred embodiment, the proportion of carbon particles and/or solid particles that are not carbon particles present in the cracks, relative to the total number of particles in the wear protection layer according to the invention, is in each case ≤0.5%, more preferably in each case ≤0.1%, even more preferably in each case ≤0.05%, most preferably in each case ≤0.02%.

In a further preferred embodiment, the proportion of the sum of carbon particles and solid particles other than carbon particles present in the cracks, relative to the total number of particles in the wear protection layer according to the invention, is ≤0.5%, more preferably ≤0.1%, even more preferably ≤0.05%, most preferably ≤0.02%.

The proportion of particles in the cracks in relation to the total number of particles is determined in microscopic images of cross sectional polishes or running surface polishes. For this purpose, the particles are counted over an area of at least 10 μm×10 μm and the proportion of particles in the cracks is determined. The area is selected depending on the size and distribution of the particles so that a sufficiently large number of particles can be seen in the area, preferably at least 200 particles. The production of microsections is described in more detail below.

In a further preferred embodiment, the cracks are surprisingly also substantially not filled with iron or iron alloy, i.e. they are substantially empty. This has the advantage that the cracks are open and can therefore fill with engine oil on the surface during operation of a piston ring and thus act as a lubricating film. In addition, combustion residues from the engine oil can be deposited in these open cracks, which also improve the sliding properties. In this way, a particularly effective sliding film (tribofilm) is formed.

When heating according to step (d) to 300 to 700° C., an iron oxide layer forms on the surface of the cracks, since the cracks contain air and the oxygen in the air oxidizes the iron surface of the cracks. The surface of the cracks therefore preferably has an iron oxide layer.

In a preferred embodiment, ≤3% by volume of the cracks, based on the total volume of the cracks, are filled with iron or iron alloy. More preferably, ≤2% by volume of the cracks, based on the total volume of the cracks, are filled with iron or iron alloy, even more preferably ≤1% by volume of the cracks, based on the total volume of the cracks, are filled with iron. The volume percentage of cracks filled with iron or iron alloy can be determined in a cross sectional polish or running surface polish using the coloration in microscopic images, as metal in the darker-colored cracks appears lighter, as do the crack-free areas of the wear protection layer. Determining the area percentage over several polishes, preferably 2 to 3 polishes, corresponds to the volume percentage.

The pH value of the electrolyte in the process is ≤0. It was found in the context of the invention that with this low pH value it is possible to achieve that an advantageous crack structure is formed, with a relatively low crack density, and at the same time particles are preferably not embedded in the cracks of the layer. As a result, the particle distribution in the layer is very uniform.

In particular, the crack structure ensures stress relief in the layer and thus a high dimensional stability of the wear protection layer according to the invention. As described above, the uniform particle distribution improves the wear behavior because the solid particles make a significant contribution to the wear resistance and so there are no large areas in which there are no or only very few particles. Furthermore, the particles are not predominantly in the cracks, but in the so-called matrix, where they are particularly firmly bound in the matrix, which means that the particles do not break out of the surface so easily during operation.

The pH value of the electrolyte is preferably ≤−0.1, more preferably −0.5 to −0.1. In a preferred embodiment, the pH value is thus negative. i.e. the $H_3O^+$ concentration is >1 mol/l. Strong acids are preferably used to adjust the pH of the electrolyte; hydrochloric acid is preferred.

In a preferred embodiment, after the deposition step (b), the direction of the current is reversed in a further step (b1). In this step (b1), which is also referred to as the polarity reversal step, crack formation is interrupted. Furthermore, the cracks are widened in the polarity reversal step, provided that the polarity reversal step is carried out for some time. It is particularly advantageous to interrupt the formation of cracks by reversing the polarity, as a result of which new cracks form when the current direction is subsequently reversed again and a further wear protection layer is deposited. As a result, if a polarity reversal step is integrated into the process for producing the wear protection layer, the cracks in the layer are shorter. In contrast to longer cracks, these shorter cracks distribute the mechanical energy even better during deformation, which increases the dimensional stability of the wear protection layer.

The preferred method thus comprises the additional steps of (b1) after step (b) the current direction is reversed, wherein the anodic current density is 1-30 $A/dm^2$ and then
the current direction is reversed again and step (b) above is carried out again.

In the polarity reversal step (b1), the current direction is reversed preferably for at least 0.1 seconds, more preferably for at least one second, even more preferably for at least 10 seconds and most preferably for at least 30 seconds, in particular 30-180 seconds. The current density in the polarity reversal step is preferably 1-30 $A/dm^2$ (amperes per square decimeter), more preferably 2-20 $A/dm^2$, in particular 3-10 $A/dm^2$.

In a preferred embodiment of the process, the current direction is reversed at least five times, in particular at least 10 times, most preferably 10-30 times. In this way, several individual wear protection layers are deposited on top of each other, in each of which new cracks are formed. The several layers form a complete wear protection layer.

Preferably, the electrolyte contains a Fe(II) compound in an amount corresponding to 150-450 g/l iron(II) chloride, in particular 200-400 g/l iron(II) chloride. It is further preferred that the electrolyte contains fewer Fe(III) compounds than correspond to 30 g/l Fe(III) chloride, in particular fewer Fe(III) compounds than correspond to 10 g/l Fe(III) chloride. More preferably, the electrolyte contains <50 g/l Fe(III) salts, in particular <30 g/l Fe(III) salts.

In a preferred embodiment, the electrolyte contains <20 g/l of metal salts other than iron salts, more preferably <10 g/l and most preferably <5 g/l of metal salts other than iron salts. In a preferred embodiment, the Fe(II) compound in the electrolyte is $FeCl_2$.

A preferred electrolyte comprises:

150-500 g/l $FeCl_2 \cdot 4H_2O$, in particular 200-450 g/l $FeCl_2 \cdot 4H_2O$, 1-40 g/l each of carbon particles and solid particles which are not carbon particles, and particularly preferably one or more surface-active compound(s), wherein the pH value is ≤0, preferably ≤−0.1.

The current density in deposition step (b) is 10-80 A/dm$^2$, preferably 20-70 A/dm$^2$ and most preferably 30-50 A/dm$^2$.

The temperature of the electrolyte during the process is preferably ≤50° C., more preferably 15-45° C., most preferably 20-40° C.

The electrolyte may also contain conventional electrolytic additives and catalysts that support the deposition of the iron layer. These can be present in the electrolyte in the usual quantities.

The duration of the deposition is selected depending on the desired thickness of the wear protection layer, wherein the higher the current density and the longer the deposition takes place, the thicker the layer becomes. The deposition is preferably carried out for 5-240 minutes, in particular 10-120 minutes. The polarity reversal step is advantageously carried out for 0.1-600 seconds, in particular 5-200 seconds.

The wear protection layer can consist of several layers, which are applied one after the other by repeating the deposition step (b) and the polarity reversal step (b1). If several layers are applied and particles are deposited, a coating can be achieved which has an even more uniform distribution of cracks over the entire thickness, since the cracks are not always formed in the same places. Preferred are 1-100 repetitions of steps (b) and (b1), in particular 2-50 repetitions and preferred are 5-30 repetitions.

The thickness of the wear protection layer is preferably 10-600 μm, more preferably 20-400 μm, particularly preferably 30-200 μm and most preferably 40-150 μm. The layer thickness is determined by determining the height of the layer in a cross sectional polish. If the surface is uneven, the layer thicknesses are determined at at least five points, preferably 6-10 points, and the arithmetic mean value is determined. This is then the layer thickness of the wear protection layer, which can also be referred to as the average layer thickness.

The amount of solid particles (carbon particles and solid particles which are not carbon particles) contained in the electrolyte in the process according to the invention can vary over a wide range. It has been found to be advantageous for the electrolyte to contain 0.1-200 g/l each of carbon particles and solid particles which are not carbon particles, independently of one another. Particularly preferred are 0.5-50 g/l each, most preferably 2-30 g/l, based on the total volume of the electrolyte.

Depending on the density of the solid particles, the volume fraction of the solid particles in relation to the total volume of the wear protection layer can vary in slightly wider ranges than the weight fraction.

The average width of the cracks (crack width) in the wear protection layer is preferably 0.02-2 μm, more preferably 0.05-1.5 μm, even more preferably 0.1-1 μm and most preferably 0.1-0.8 μm.

The crack width is determined by measuring the width of at least 10 randomly selected cracks by measuring approximately perpendicular to the course of the crack and determining the arithmetic mean of these at least 10 measured crack widths. Microscopic images of surface polishes (running surface polish) or cross sectional polishes can be taken for measurement, preferably cross sectional polishes are used, as described in more detail below. Essentially, in the case of a running surface polish, for example, the surface is ground with sandpaper and then polished and the surface is then viewed in a microscopic image in order to determine the crack width. The cracks differ from the rest of the wear protection layer in terms of coloration, wherein the cracks have a darker coloration.

Furthermore, the surface proportion of cracks on the surface of the wear protection layer can be determined using a running surface polish. To determine the surface area of the cracks, an area of at least 40 μm×40 μm is taken and the proportion of dark coloration, i.e. the proportion of cracks on the surface in relation to the total area, is determined by measurement. This is determined on at least three randomly selected squares of at least 40 μm×40 μm, and the arithmetic mean is determined from these three measurements. The value determined in this way is the surface proportion of cracks on the surface of the wear protection layer. The surface proportion of cracks on the surface of the wear protection layer is preferably 0.5-10%, preferably 1-8%, in each case in relation to the entire surface of the wear protection layer.

The average crack density of the wear protection layer is 10-160 cracks per mm (millimeter). Preferred is an average density of 20-140 cracks per mm, more preferably 30-120 cracks per mm and most preferably 35-110 cracks per mm. To determine the average crack density, at least two cutting lines of at least 1 mm in length are placed in different directions over a microscopic image of a surface polish (running surface polish), the crack density (number of cracks intersecting the line) is determined by counting, and the arithmetic mean value is formed from these at least two counts.

In a preferred embodiment, the cracks on the surface can be slightly widened again in a polarity reversal step (b1) following the deposition of the wear protection layer. This can produce a higher surface area of the cracks on the surface, whereby the cracks can absorb even more lubricant, in particular engine oil, and thus achieve better sliding properties right at the start of use of the wear protection layer. This can improve the running-in behavior of the wear protection layer.

The depth of the cracks in the wear protection layer can also be determined. Similar to the determination of the crack width, a micrograph is produced. For the crack depth, a cross sectional polish is produced in which the layer (including the base body, which may be coated) is cut perpendicular to the surface of the wear protection layer and then the surface is ground with sandpaper and then polished, as in the production of a surface polish. The cross sectional polish produced in this way is then viewed microscopically and the crack depth can be determined from the darker coloration of the cracks by measuring the expansion perpendicular to the surface of the wear protection layer. The arithmetic mean value is determined from at least 10 cracks. The average crack depth of the wear protection layer obtained in this way is preferably 1-40 µm, particularly preferably 3-30 µm, more preferably 5-20 µm and most preferably 7-15 µm.

The piston ring is preferably a piston ring which has a base body, wherein the base body has as surfaces an inner circumferential surface, a first flank surface, a second flank surface and a running surface. The wear protection layer according to the invention is applied to at least one of the surfaces, in particular the running surface. The base body can be made of the usual materials used for piston rings, preferably the base body is made of cast iron or steel, e.g. chromium steel. There may be further layers below or above the wear protection layer, for example an adhesive layer between the base body and the wear protection layer and/or a running-in layer above the wear protection layer, which further improves the running-in behavior.

A piston ring is obtainable by the method.

Preferred is a piston ring for internal combustion engines, available through
  (a) providing a piston ring having a surface comprising a wear protection layer of iron or an iron alloy applied to the surface, wherein the wear protection layer has cracks, and the cracks have an average density of 10-160 cracks per mm of the wear protection layer, wherein the iron or iron alloy have incorporated therein 0.2-15% by weight, based on the total weight of the wear protection layer, of carbon particles and 0.2-15% by weight, based on the total weight of the wear protection layer, of solid particles other than carbon particles, and
  (b) heating the piston ring to 300-700° C.

The use of the piston ring in an internal combustion engine is provided. For this purpose, the piston ring is inserted into the piston of an internal combustion engine in a manner known to a skilled person.

It is understood that the above-mentioned features and those to be explained below can be used not only in the combinations indicated, but also in other combinations or in a stand-alone position, without going beyond the scope of the present invention.

THE DRAWINGS

FIG. 1 shows a microscopic image of a running surface polish of a wear protection layer in which cracks on the surface can be seen.

DETAILED DESCRIPTION

The invention is explained in more detail in the following example and comparative example, without limiting the invention to these.

Example: Production of an Iron Layer According to the Invention with Diamond Particles and Particles of Cubic Boron Nitride An aqueous iron electrolyte with the following composition is provided:

300 g/l $FeCl_2 \cdot 4H_2O$ 5 g/l polyfluorinated sulfonates
Diamond particles 15 g/l, diameter 0.2-0.7 µm
cubic boron nitride, 15 g/l, diameter 0.2-0.7 µm
pH value=−0.2 (adjusted with hydrochloric acid)

The 15 g/l of crystalline diamond particles with a particle size of 0.2 to 0.7 µm and 15 g/l of cubic boron nitride particles with a particle size of 0.2-0.7 µm are dispersed in this iron electrolyte at 30° C. by stirring. A piston ring made of chromium steel is pretreated as usual by pickling it in hydrochloric acid, degreasing it and applying a layer of nickel approx. 2 µm thick. The piston ring is placed in the electrolyte and initially cathodically switched in a first step and an iron layer is deposited for 5 minutes at a current density of 40 $A/dm^2$. In a second stage, the polarity is reversed, with anodic switching of the piston ring for 45 seconds at a current density of 4 $A/dm^2$. This cycle, namely cathodic chromium plating for 5 minutes and anodic etching for 45 seconds, is repeated a total of 10 times, resulting in an iron-diamond particle layer with a thickness of approx. 60 µm. The coated piston ring is then heated to a temperature of 400° C. for 1 hour.

To create a microscopic image of the surface, a running surface polish of the piston ring is produced and a cross sectional polish of the piston ring is produced for a microscopic image of the cross-section of the layer. To create the running surface section, the surface of the piston ring is ground with SiC wet-grinding paper with increasing grains (220-4000) and then polished with a 1 µm diamond suspension until the sample is scratch-free and contour-sharp.

To produce a cross sectional polish, the piston ring is cut perpendicular to the running surface and on the resulting cut surface as in the production of the running surface polish, the surface is ground and polished with SiC wet-grinding paper as described above.

Subsequently, microscopic images of the running surface polish and the cross sectional polish are taken.

The crack density was 50 cracks/mm.

Comparative Example 1: Production of an Iron Layer with Diamond Particles, Without Cracks in the Layer To produce a crack-free iron layer, a conventional iron sulphate electrolyte (pH=1.4) was used for deposition according to example 1 of DE 195 08 419 C1, which also contained the usual wetting agent and diamond particles in the diameter range 0.2-0.7 µm.

The cross sectional polishes and running surface polishes show that the layer did not exhibit any cracks according to this comparative example.

The layers on the piston rings according to the example and comparative example were subjected to a wear test and a measurement of the dimensional stability.

A rig test was carried out to measure wear, wherein the piston rings were run on a cylinder as a running partner for 23 hours with engine oil and a stroke corresponding to the usual engine stroke. The wear was then measured on the running surface of the piston rings and the cylinder running surface.

The ring wear was 9 µm for the above example and 19 µm for the above comparison example 1. The liner wear was 7.5 µm for the example and 16.5 µm for comparison example 1. Thus, in the example, both the ring wear, i.e. the wear of the wear protection layer according to the invention, and the wear of the running partner, i.e. the cylinder running surface (liner), are significantly reduced compared to comparative example 1.

To determine the dimensional stability, the piston rings were clamped in a machine and bent in both directions relative to their original shape until they broke. It was found that the wear protection layers according to the invention in the above example had a significantly higher dimensional stability than in the comparative example 1. This clearly shows the advantages of the wear protection layer according to the invention with regard to the increased dimensional stability and the lower wear.

Comparative Example 2: Production of an Iron Layer with Diamond Particles in a Cracked Layer An aqueous iron electrolyte with the following composition is provided:

300 g/l $FeCl_2 \cdot 4H_2O$ 5 g/l polyfluorinated sulfonates
Diamond particles 15 g/l, diameter 0.2-0.7 μm
pH value=−0.2

The 15 g/l crystalline diamond particles with a particle size of 0.2 to 0.7 μm are dispersed in this iron electrolyte at 30° C. by stirring. A chrome steel piston ring is pretreated as usual by pickling it in hydrochloric acid, degreasing it and layer it with a layer of nickel approx. 2 μm thick. The piston ring is placed in the electrolyte and initially cathodically switched in a first stage and an iron layer is deposited at a current density of 40 A/dm$^2$ for 5 minutes. In a second stage, the polarity is reversed with anodic switching of the piston ring for 45 seconds at a current density of 4 A/dm$^2$. This cycle, namely cathodic chromium plating for 5 minutes and anodic etching for 45 seconds, is repeated a total of 10 times, resulting in an iron-diamond particle layer with a thickness of approx. 60 μm. The coated piston ring is then heated to a temperature of 400° C. for 1 h.

To create a microscopic image of the surface, a running surface polish of the piston ring is produced as described above and a cross sectional polish of the piston ring is produced for a microscopic image of the cross-section of the layer. Subsequently, microscopic images of the running surface polish and the cross sectional polish are produced. The cross sectional polishes and running surface polishes show that the layer exhibited cracks according to this comparative example. The crack density was 80 cracks/mm.

The layer on the piston ring according to comparison example 2 was also subjected to a wear test. To measure wear, a rig test was carried out as described above, wherein the piston rings were run on a cylinder as a running partner for 23 hours with engine oil and a stroke corresponding to the usual engine stroke. The wear was then measured on the running surface of the piston rings and the cylinder running surface.

The ring wear for comparison example 2 was 19.3 μm. The liner wear for comparison example 2 was 8.5 μm.

Overall, it was thus shown that both the ring wear, i.e. the wear of the wear protection layer according to the invention, and the wear of the running partner, i.e. the cylinder running surface (liner) of the example according to the invention are improved compared to both comparative examples 1 and 2.

What is claimed is:

1. A piston ring for an internal combustion engine, comprising a wear protection layer of iron or an iron alloy applied to a surface of the piston ring, wherein the wear protection layer has cracks and the cracks have an average density of 10-160 cracks per mm of the wear protection layer, wherein 0.2-15% by weight, based on the total weight of the wear protection layer, of carbon particles and 0.2-15% by weight, based on the total weight of the wear protection layer, of solid particles which are a different type of particle than the carbon particles are embedded in the iron or the iron alloy of the wear protection layer.

2. The piston ring according to claim 1, wherein a proportion of the carbon particles and/or the solid particles, that are a different type of particle than the carbon particles, located in the cracks, relative to a total number of particles, in the wear protection layer is <0.1% in each case.

3. The piston ring according to claim 1, wherein a proportion of the sum of the carbon particles and solid particles, which are a different type of particle than the carbon particles, which is located in the cracks is <0.05% in relation to a total number of particles in the wear protection layer.

4. The piston ring according to claim 1, wherein the carbon particles are partially converted into iron-carbon compounds.

5. The piston ring according to claim 1, wherein the average density of the cracks is from 30 to 120 cracks per mm of the wear protection layer.

6. The piston ring according to claim 1, wherein the cracks have an average width of 0.05-1.5 μm.

7. The piston ring according to claim 1, wherein the carbon particles and/or the solid particles, which are a different type of particle than the carbon particles, each have an average particle size of 0.05-3 pm independently of one another.

8. The piston ring according to claim 1, wherein the carbon particles are made of diamond and/or graphite and/or the solid particles, which are a different type of particle than the carbon particles, are made of tungsten carbide, chromium carbide, aluminum oxide, silicon carbide, silicon nitride, boron carbide and/or cubic boron nitride.

9. The piston ring according to claim 1, wherein the solid particles, which are a different type of particle than the carbon particles, are made of cubic boron nitride.

10. The piston ring according to claim 1, wherein the iron alloy comprises ≥90% by weight of iron, based on the total weight of the iron alloy.

11. The method of manufacturing the piston ring according to claim 1, comprising the steps of:
   (a) placing the piston ring in an aqueous electrolyte containing:
      an iron (II) compound in an amount corresponding to 100-500 g/l $FeCl_2$,
      the carbon particles,
      the solid particles, which are a different type of particle than the carbon particles, and
      optionally a salt of a further metal,
      wherein a pH of the aqueous electrolyte is <0, then
   (b) galvanically depositing the wear protection layer of iron or iron alloy on the piston ring at a cathodic current density of 10-80 A/dm$^2$, then
   (c) drying the piston ring with wear protection layer, and then
   (d) is heated heating the piston ring to 300-700° C.

12. The method according to claim 11, wherein a pH value of the aqueous electrolyte is ≤−0.1.

13. The method according to claim 11, wherein after step (b) a current direction is reversed, wherein an anodic current density is 1-30 A/dm$^2$, then the current direction is reversed again and step (b) is carried out again.

* * * * *